(12) United States Patent
Cummins

(10) Patent No.: US 7,879,921 B2
(45) Date of Patent: Feb. 1, 2011

(54) FLUID PERMEABLE COMPOSITE MATERIAL AND PROCESS FOR SAME

(76) Inventor: John Arthur Cummins, 198 A MacDonnell Road, Clontarf, Queensland (AU) 4019

( * ) Notice: Subject to any disclaimer, the term of this patent is extended or adjusted under 35 U.S.C. 154(b) by 821 days.

(21) Appl. No.: 11/569,717

(22) PCT Filed: May 30, 2005

(86) PCT No.: PCT/AU2005/000751

§ 371 (c)(1),
(2), (4) Date: Nov. 28, 2006

(87) PCT Pub. No.: WO2005/116135

PCT Pub. Date: Dec. 8, 2005

(65) Prior Publication Data

US 2008/0058461 A1    Mar. 6, 2008

(30) Foreign Application Priority Data

May 28, 2004    (AU) ................ 2004902827

(51) Int. Cl.
*E01C 15/00*    (2006.01)
(52) U.S. Cl. ............ 521/64; 524/444; 404/17; 525/123
(58) Field of Classification Search ............ 521/61–64; 524/444; 404/17; 525/123; *E01C 15/00*
See application file for complete search history.

(56) References Cited

U.S. PATENT DOCUMENTS

| | | | |
|---|---|---|---|
| 4,587,278 A * | 5/1986 | Dotzauer et al. ............ 523/200 |
| 5,422,391 A * | 6/1995 | Inoue ........................ 524/427 |
| 5,432,213 A | 7/1995 | Kim et al. |
| 5,589,115 A * | 12/1996 | Sherwood ................ 156/89.26 |
| 6,103,783 A | 8/2000 | Hong |
| 6,566,445 B1 * | 5/2003 | Van Kesteren et al. ...... 524/589 |
| 2002/0048676 A1 | 4/2002 | McDaniel |
| 2003/0065082 A1 | 4/2003 | Blanken |
| 2004/0221769 A1 * | 11/2004 | Hokkirigawa et al. ....... 106/282 |

FOREIGN PATENT DOCUMENTS

| | | |
|---|---|---|
| CA | 2 236 499 | 11/1999 |
| DE | 3630825 | 3/1987 |

(Continued)

OTHER PUBLICATIONS

English Machine Translation of JP 2003-166202. pp. 1-8.*

(Continued)

*Primary Examiner*—Milton I Cano
*Assistant Examiner*—Brieann R Fink
(74) *Attorney, Agent, or Firm*—Renner, Otto, Boisselle & Sklar, LLP

(57) ABSTRACT

A fluid permeable material is disclosed. The fluid permeable material is suitable for use as a paver, brick, tile, stormwater entry grate and the like, without being limited thereto. The fluid permeable material described in this invention is light weight and has a height characteristic breaking strength, and flexural strength. The fluid permeable material described allows fluid to flow freely through the structure without impacting on the structural integrity of the composite material, and filters particulate contaminants from the fluid as it passes through the structure.

15 Claims, 2 Drawing Sheets

FOREIGN PATENT DOCUMENTS

| | | | |
|---|---|---|---|
| DE | 19522091 A1 | * | 1/1997 |
| EP | 0 600 099 | | 6/1994 |
| GB | 952186 | | 3/1964 |
| GB | 1124498 | | 8/1968 |
| GB | 1 367 527 | | 9/1974 |
| JP | 53035227 A | * | 4/1978 |
| JP | 10219100 A | * | 8/1998 |
| JP | 11310719 A | * | 11/1999 |
| JP | 2003166202 A | * | 6/2003 |
| JP | 2004067917 A | * | 3/2004 |

OTHER PUBLICATIONS

Product Details: Desmodur N 3300, 3350 BA, 3390, and 3600. Edition 2006. p. 1-4.*
Machine translated English equivalent of JP 2004067917 A.*
Machine translated English equivalent of DE 19522091 A1.*
Machine translated English equivalent of JP 11310719 A.*
Machine translated English equivalent of JP 10219100 A.*
Machine translated English equivalent of JP 2004067917 A, Mar. 2004.*
Machine translated English equivalent of DE 19522091 A1, Jan. 1997.*
Machine translated English equivalent of JP 11310719 A, Nov. 1999.*
Machine translated English equivalent of JP 10219100 A, Aug. 1998.*
Written Translation of JP 53035227 A, Apr. 1978.*
Supplementary European Search Report.
Database WPI Week 198637; Derwent Publications Ltd., London, GB; AN 1986-242925; XP002433933 & JP 61 172901.
Database WPI Week 200002; Derwent Publications Ltd., London, GB; AN 2000-023564; XP002433934 & WO 99/57200.
Derwent abstrat accession No. 2000-023564/02, WO 1999/057200 A1 (Kobata H) Nov. 11, 1999.

* cited by examiner

FLUID PERMEABLE COMPOSITE MATERIAL AND PROCESS FOR SAME

This application is a national phase of International Application No. PCT/AU2005/000751 filed May 30, 2005 and published in the English language.

FIELD OF THE INVENTION

This invention relates to a light weight, fluid permeable composite material suitable for use as a paver, brick, tile, stormwater entry grate and the like, without being limited thereto. In particular, the invention relates to a curable composition for producing a fluid permeable composite material having high characteristic breaking strength and flexural strength. The fluid permeable material described in this invention, allows fluid to flow freely through the structure without impacting on the structural integrity of the composite material. the fluid permeable material, and filters particulate contamination from the fluid as it passes through the structure. This invention also relates to the process of manufacturing the fluid permeable composite material.

BACKGROUND OF THE INVENTION

Presently, surfaces of roads, driveways, pathways and patios are covered with a variety of materials shaped in the form of paving tiles or the like. Typically, such paving and paving tiles are made of compositions such as from cementitious materials which include blended sands, UV resistant natural oxides, optionally natural stones and dry cement to bind the composite material together. Alternatively the compositions could consist of clays mixed with some or all of the above materials, and fired to high temperatures to create the tiles or pavers. However these traditional materials have several shortcomings.

A key disadvantage of such concrete and fired clay materials is impermeability to fluids, in particular, water. Areas covered by paving tiles or pavers are typically arranged such that surface water is collected at a drainage point and directed to flow to storm water outlets and outfall waterways, carrying with it all manner of pollutants and contaminants collected from the impervious surface. Upon discharge, the pollutants contaminate those outfall waterways, rendering them unsuitable as urban water resource, and unable to sustain normal marine life.

Further, impervious pavements with stormwater collection systems prevent stormwater from returning to subterranean aquifers, which are the natural collection points for stormwater, resulting in a reduction in water levels of subterranean aquifers and increase in salinity of the subterranean water. This renders subterranean aquifers unsuitable as an urban water resource.

Additionally when insufficient water drainage occurs, eg. from rain water or cleaning water, water collects or pools on the surface. Such pooling often results in dangerous situations, including vehicular aquaplaning on tarmacs and roads as well as various personal injuries which occur from accidents on slippery surfaces, eg. public building entries, car parks and the like.

Further, traditional concrete based and fired, clay pavers exhibit brittle failure due to the nature of the elements in the compositions, and often break suddenly under higher weight loads as can occur with vehicular use.

The invention when used in the urban environment in place of similar impervious composite materials, filters pollutants from stormwater run off thus reducing pollution of outfall waterways, and allows storm water to return to traditional subterranean aquifers by flowing through the pavement, thereby reducing the depletion and salination of important urban water resources.

OBJECT OF THE INVENTION

Accordingly, it is an object of the invention to provide a hard, flexible, load bearing composite material which allows water to freely permeate therethrough and thereby overcome or alleviate one or more of the problems of the prior art or provide a useful commercial alternative.

SUMMARY OF THE INVENTION

According to a first aspect of the present invention there is provided a curable composition for producing a fluid permeable composite material comprising:
  a particulate material; and
  a binding agent including:
    25% and 40% by weight of an acrylic polymer based on methacrylate;
    0 to 20% by weight of fibre,
    10 to 35% by weight of a homopolymer of an isocyanate and corresponding isocyanate polymerizing agent for forming a crosslinked polymer with said acrylic polymer based on methacrylate;
  Preferably, the curable composition comprises 20% to 50% by weight of a low molecular weight viscous solvent.

The particulate material may be independently selected from various stone or ceramic aggregates. Preferably, the particulate material is Basalt.

Suitable acrylic polymers based on methacrylates may be selected from ethyl acrylate, ethyl methacrylate, methacrylate co-polymers, methyl methacrylic, butyl methacrylic and methyl methacrylate copolymer. Preferably, methyl methacrylate co-polymer is used and is present between 20% and 50% of the binding agent. More preferably, the methacrylate co-polymer is present between 25 and 40% and even more preferably, is 30% of the binding agent.

Fibres find use in the present composition. Suitable fibres may be selected from fibres such as Glass fibre, Aramid fibre or Carbon fibre, or from natural fibres which include, but are not limited to, silk, jute, hemp, sisal. Suitably, fibres are glass fibres. Suitable glass fibre lengths are from 0.05 mm to 6 mm fibre length. More suitably, the glass fibre lengths are 3 mm. Suitably the fibres are present from 0 to 25% of the binding agent. More suitably, the inclusion of glass fibres is present at about 9% of the binding agent. It will be appreciated by the skilled person that if fibres other than glass are chosen, the required density of fibre within the composition may be attained with quantities which vary from the disclosed weight of glass fibre and the disclosed lengths of glass fibre. For example when compared to aramid fibre, glass fibre has a higher specific gravity than aramid fibre, so the required density of fibre within the cured binding material will be obtained with greater weight of glass fibre than with aramid fibre.

The homopolymer of the isocyanate and the corresponding isocyanate polymerizing agent may be selected from hexamethylene diisocyanate homopolymer (homo HDI): hexamethylene diisocyanate (HDI), Methylene diphenyl diisocyanate homopolymer: Methylene diphenyl diisocyanate, Toluene diisocyanate homopolymer: Toluene diisocyanate, Polymeric Methylene diphenyl diisocyanate homopolymer: Polymeric Methylene diphenyl diisocyanate, Naphthalene diisocyanate homopolymer: Naphthalene diisocyanate, Methyl isocyanate homopolymer: Methyl isocyanate. Preferably, the homopolymer of the isocyanate and corresponding isocyanate is HDI homo:HDI and is present between 10 and 50% by weight. Preferably, the homopolymer of the isocyanate and the corresponding isocyanate polymerizing agent is present between 20 and 40%, and more preferably, at about 25% of the binding agent.

Preferably, the polymerizing agent is HDI and is present at about 0.02 to 0.005% of the binding agent.

The low molecular weight viscous solvent may be selected from C1-C6 esters including tert-butyl acetate, n-butyl acetate, hydrocarbon solvents which include benzene, toluene, dimethyl benzene and its isomeric forms, ethyl benzene, cyclohexane, cumene, naphthalene, anthracene, biphenyl, cycloterpenes, terphenyl, or C1-C6 ketones. Preferably, the viscous solvent is butyl acetate and is present between 0 and 60% and preferably between 20% and 50%. More preferably, butyl acetate is present at about 37% of the binding agent. Variables such as temperature and humidity effect the viscosity of the mixture, and the quantity of the low molecular weight solvent is adjusted according to prevailing environment.

Suitably the viscosity of the binding agent should be adjusted so the binding mixture is sufficiently viscous so as to cling to the surface of the particulate material when the particulate matter has been coated with the binding material.

The low molecular weight solvent is also present to facilitate the creation of maximum void area within the cured composite material. As the composite cures, the viscous solvent flashes off, thereby reducing the volume of the binding material within the cured composite material and maximizing the area of void within the composite.

According to a second aspect of the invention, there is provided a process of manufacturing a fluid permeable composite material including the steps of:
1. compressing the curable composition of the first aspect; and
2. curing said composition at a temperature of about 10° C. above the glass transition temperature of the crosslinked polymer as present in the binding mixture. and subsequent reducing said temperature.

Preferably, the process includes the step of pre-coating the particulate material with a viscosity adjusted binding agent.

More preferably, the process further includes the step of coating the cured pre-coated particulate material with the binding agent.

According to a third aspect of the present invention there is provided an article of manufacture when produced by the process of the second aspect.

Preferably, said article of manufacture is selected from a paving tile, tile, brick, floor or wall covering, retaining wall and inlet pit cover (grate). In one embodiment, the article of manufacture is a paving tile or the like. In an alternative embodiment, the article of manufacture is an inlet pit covering to filter stormwater catchment prior to discharge to outfall waterways.

BRIEF DESCRIPTION OF THE DRAWINGS

In order that the present invention may be more readily understood and placed into practical effect, preferred embodiments of the invention and prior art will be described, by way of example only, with reference to the accompanying drawings, in which.

DETAILED DESCRIPTION

EXAMPLES

Example 1

Binding Agent Composition

Figure 1:
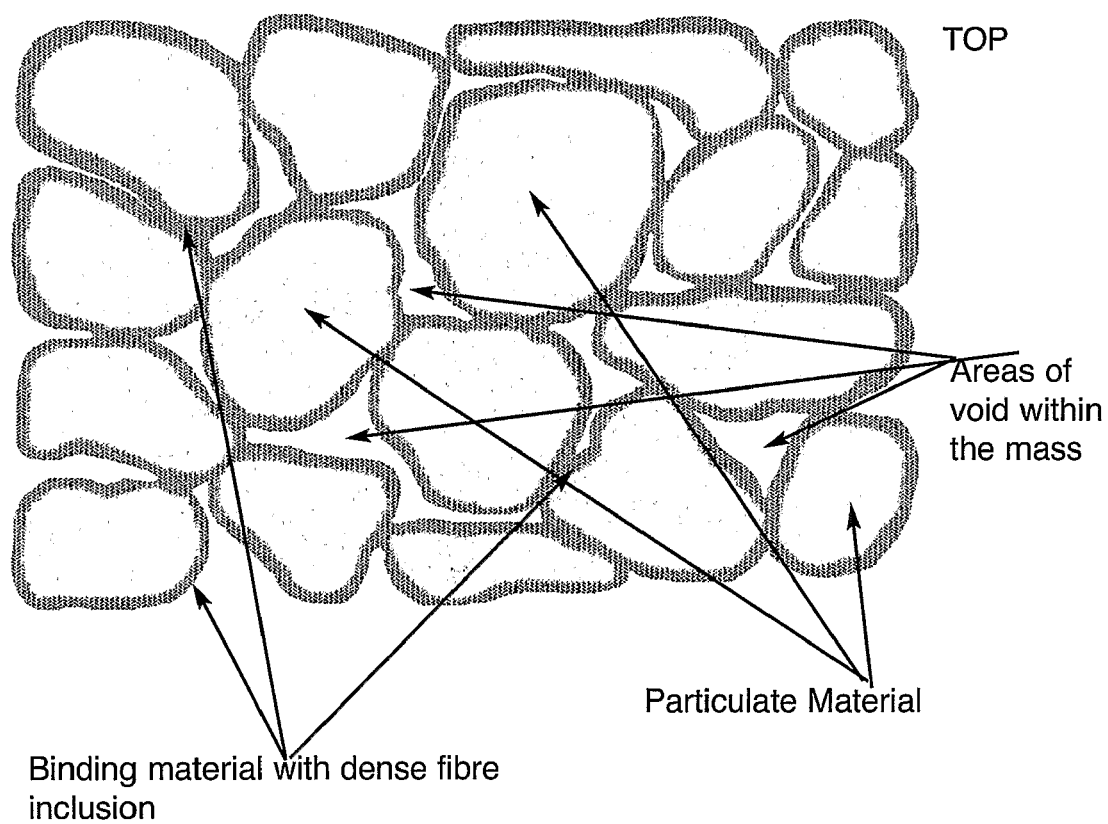
FIG. 1 is a representative drawing looking down on the fluid permeable composite material, showing the particulate material bound by the polymer encased fibrous binding material, and the voids which have been created between the particulate material.
Figure 2:
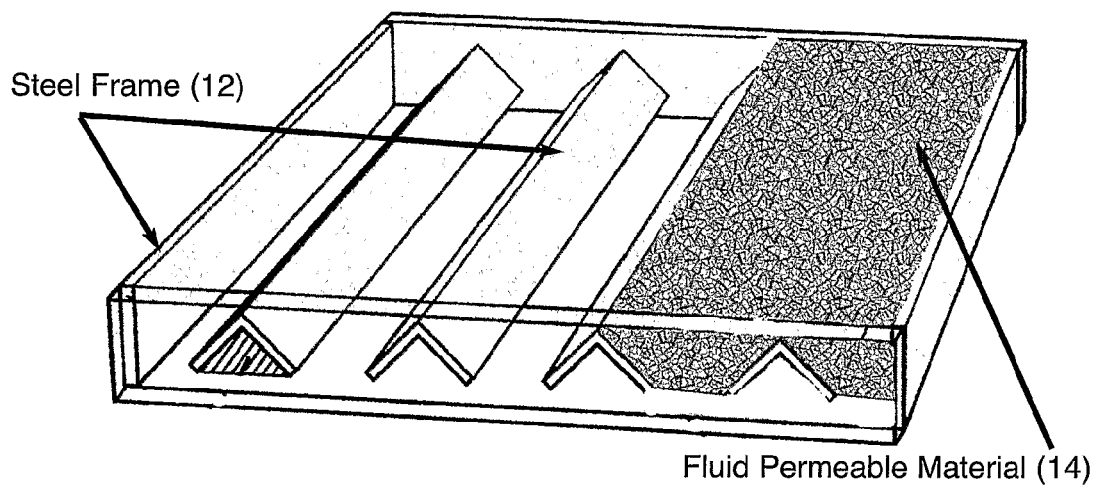
FIG. 2 is a perspective view of an in ground stormwater inlet pit covering according to a preferred embodiment of the invention.

Percentages are expressed in percentage by weight as are all percentages herein unless expressly specified otherwise.

Part 1

Methacrylic copolymer, with a hydroxil functional value of about 150 KOH/g (33.75%) is added to n-butyl acetate (33.75%). This mixture is then added to the mixed constituents of Part 2.

Part 2

In a separate vessel, the following are combined: n-butyl acetate (9%), 1,6Hexamethylene diioscyanate homopolymer (HDI Homo) (approx. 13.5%), hexamethylene diioscyanate (0.005%)

Part 3

The glass fibre (10%) 3 mm fibre size is mixed into the mixture of Part 1 and Part 2.

In this binding agent composition, substitutions of various chemicals may be made. For example, acrylic polymers based on methacrylates are used as cross-linking polyols. Such acrylic polymers are suitable as they are hard and densely branched, providing an extremely strong and durable material not obtainable with traditional polyurethanes. In addition, unlike polycarbonates and polyesters, these polymers have the required UV stable properties. Suitable acrylic polymers based on methacrylates may be selected from branched methacrylates, ethyl acrylate, methacrylate co-polymers, methyl methacrylic, butyl methacrylic and methyl methacrylate copolymer.

It will be further appreciated by a skilled person that while the preferred embodiment describes a methacrylate co-polymer with a hydroxil functional value of 150 KOH/g, the hydroxil value may be tailored to the reacting diisocyanate such that the greater the hydroxil value, the greater the quantity of isocyanates are required in the reaction. Accordingly, methacrylate co-polymer having hydroxil values ranging from 15 to 250 KOH/g may be used.

The inventor has found that in using such copolymers reinforced with the fibres, the resultant binding agent is exceptionally tough, showing very high tensile strength and shore impact resistant properties.

The mixture of Part 1 and the mixture of part 2 are combined in a vessel, and the combined mixtures are mixed thoroughly. The fibre is added once the mixture is thoroughly mixed

Example 2

Particulate Materials

A variety of particulate materials or aggregates may be used in the fluid permeable composite material, inclusive of various rock types and ceramics. Suitable rock types include Acid igneous granitic rocks and may be selected from Granite, Adamellite, Granodiorite, Granophyre, Rhyolite and Rhyodacite.

Also suitable are Intermediate igneous rock types and may be selected from Diorite, Porphyry and Trachyte. Basic igneous rock types may be selected from Basaltic rocks, inclusive of Basalt, Dolerite and Limburgite. Further suitable are the Metamorphic rock types and may be selected from Hornfels, Quartzite, Schist, Phyllite, Gneiss and Greenstone. Suitably also, Sedimentary rock types such as River Gravel may be used. Still more suitably, the particulate material is Basalt.

While the particulate material may be regular or irregularly shaped, the material is preferably elongate so as to provide an increased surface area to which the binding agent may coat and an increased surface area of contact between the particulate material. In addition to the previously listed materials which are suitably used as the particulate material, suitable particulate material may also include shards or pieces of broken pottery and/or ceramics, inclusive of, but not limited to, silica and titanium carbides, aluminum silicates and oxides and glass. Manufactured solid materials, such as fired clay or cured cementitious compounds may also be used. The size of the particulate material ranges from 1 mm to 50 mm and may be tailored to suit the purpose of which the composite material is intended. For example, fine aggregate particulate material of 1 mm to 5 mm is suitable for use when formed into, for example, non-slip pool substrates and non slip paving for areas where people walk barefoot. Medium-sized coarse aggregate materials ranging from 10 to 20 mm are most suited for use in stormwater filtration applications, and industrial applications such as sound reduction paneling, tarmac, road and bridge surfaces, footpaths and entries where non-slip surfaces are required eg. hospitals and schools and the like. Materials coarser than 20 mm have valuable application in self draining retaining walls, and some stormwater and sewerage filtration applications.

Degree of permeability of the composite material is determined by the size and shape of the particulate material. Rounded media of average 14 mm size has greater permeability than an aggregate of 5 mm to 10 mm media of elongated shape. Typically, particulate material of 10 mm to 15 mm of irregular shape has a permeability of 30 liters per second per square meter of composite material at a thickness of 50 mm.

It will be appreciated by a skilled person that the size, shape and compressive strength of the particulate material will determine the strength, porosity, filtration and sound absorption properties of the fluid permeable composite material.

Example 3

Manufacturing Process of Fluid Permeable Composite Materials

A fluid permeable composite material is produced by the following process using the binding agent and particulate materials of Examples 1 and 2 respectively.

The selected particulate material is washed to remove all foreign matter from the surface of the particulate material. This preferable washing step involves immersing the material in water and vibrating or agitating it to separate out unwanted foreign matter. After removing all foreign material from the surface of the particulate material, excess water is removed from the particulate material surface by drainage. The particulate material is then dried in a rotary drier until it has a moisture content of less than 0.014%. The dried particulate material is cooled to below 30 degrees Celcius.

The cooled, dry particulate material is then pre-coated by placing the material into a rotating drum with a measured quantity of binding agent which has the viscosity adjusted to about 130 cps. This is achieved by the addition of a suitable low molecular weight solvent with good volatility such as C1-C6 esters eg. tert-butyl acetate and n-butyl acetate to the binding material. Mixing of the particulate material and the pre-coat binder occurs until the particulate material's surface has been uniformly coated. This pre-coating step establishes a uniform mechanical bond between the particulate material and the binding material. As the particulate material is generally porous, and as the binding material shrinks substantially during curing, establishing a uniform mechanical bond between the particulate material and the binding material should be achieved as a preliminary process. Advantageously, this precoating also seals the surface of the particulate material and ensures moisture does not re-absorb into the particulate material. After precoating, and until the pre-coat is dry, particulate material is shaken periodically to prevent pre-coated particles from bonding to each other. Approximate quantity of binding agent of viscosity 150 cps to particulate material for the pre-coating process is ratio of 200 ml to 11 kgs of particulate material when the particle size is 10 mm to 15 mm.

When sufficiently dry, the composite material is set aside for a minimum of 48 hours to enable the precoat binding material to cure.

Subsequent to this, the composite material is again mixed with the binding agent which has not had viscosity adjusted by addition of further low molecular weight solvents, using the approximate binding agent to particulate material ratio of 440 ml of binding agent to 11 kgs of particulate material when the particulate size is 10 mm to 15 mm.

While this embodiment describes a ratio of binding agent to particulate material of 10 to 15 mm size as ca. 440 ml: 11 kg, it will be appreciated by a skilled person that this ratio will vary according to the surface area of the particulate material being used. For example, the ratio of binding agent of particulate material (of 2 mm size) is about 480 ml: 11 kg.

The uncured composite material is transferred to a contained space, such as a mould or area defined by forms and is vibrated until it is uniformly distributed throughout the contained space. This vibration process also encourages flow of binding material around the particulate material throughout the preformed mass. The dense fibre inclusion allows the binder to flow readily around the particulate material but to collect at the joins between the particulate material. Advantageously this allows build up of fibre at the points of contact between the particulate material and subsequently the formation of the largest possible area of join at points of contact between particulate material.

When directed to pavers and tiles, the composite material is then compressed in two stages. The primary stage is the application of uniform downward pressure on the edges of the mass until the greatest surface area of contact between material at the edge of the contained space is achieved without crushing the particulate material or displacing binding agent from between the particulate material.

A secondary stage of compression is carried out by applying uniform pressure over the total surface area of the material mass. Compression is applied until maximum contact between the total mass of composite material is achieved, again without crushing the particulate material or displacing binding agent from points of contact between materials.

It will be appreciated that the manufacturing process for pavers and tiles requires two stages of compression as the end product has 6 unsupported sides and is handled in sometimes abrupt conditions before it is placed into position for use.

However, when the composite material is poured in situ for roads, paths, retaining walls and the like, wherein at least one of the faces is supported, eg. the bottom, and the product is not relocated from the point of manufacture, a single stage (only) of compression over the total area of the top surface is undertaken.

This is typically carried out as a simultaneous vibration/compression phase, by a flat vibrating plate dragged across the surface whilst exerting some downward pressure.

When directed to pavers and tiles, the composite material is 'cured' by slowly raising the temperature in an oven to ca. 80° C. for several minutes, preferably between 10 and 30 minutes. This temperature range is above the glass transition temperature of 70° C. of the crosslinked polymer described in this example. A person skilled will understand that the curing temperature is specific to the actual crosslinked polymer which has been formed, and the effect on the glass transition temperature of the fibrous and solvent inclusions in the polymer. The temperature is then cooled to about 10° C. lower than the glass transition temperature, eg. 70° C. before removing from the oven. Once removed from the oven, the composite material is cooled in dry conditions to below ca 30° C. Cooling may be achieved by blowing air across the surface of the mass with a fan. Unlike conventional concrete and fired clay materials, the fluid permeable composite material of the present invention does not shrink during curing. and retains the desired dimensions and weight.

Where the composite material is poured in situ, the material is cured by heat from a source suspended above the poured material, raising the temperature of the material to above glass transition temperature.

Although not wishing to be bound by any particular theory, the present inventor reasons that the unexpectedly high strength of the cured fluid permeable composite material, once formed, is attributed to these processes.

1. the mechanical bond formed between the particulate material and the binding agent during the pre-coat process,
2. the reinforcement of the binding material by the dense fibrous inclusion into the binding mixture.
3. the establishment of the largest surface area of contact between particulate matter during the compression phases.
4. the establishment of the largest possible build up of cured binder at the areas of joins between particulate material by the vibration phase, and the compression phase.

It may be appreciated by a skilled person that the above composition may be varied to accommodate various processing conditions such as temperature and humidity which may influence solubilities within the mixtures.

Advantageously, the fluid permeable composite material is substantially lighter in weight than traditional composite materials. For example, a square meter of concrete pavers of 50 mm thick weighs ca 115 kgs. whereas a square meter of the fluid permeable composite material of 50 mm thick weighs ca. 66 kgs. The lighter weight is due to the area of voids within the permeable mass. The advantages of this light weight material are ease of transportability and workability, and less structural support required if used above ground level such as for retaining walls, sound proofing barriers and the like.

Example 4

Performed Test Results

Fluid Permeability

The fluid permeable composite material has unique and advantageous physical properties as compared to traditional concrete or other composite materials. Significantly, the present invention provides a highly porous and fluid permeable composite material, which allows water to flow freely through the composite material. Typically, water flow rate is 30 liters per second through an area of 1 square meter at 50 mm thick constructed from an aggregate of 10 mm to 15 mm particulate material.

In an example of an application using the fluid permeable composite material, three pavers were prepared and tested for porosity. The pavers were sealed with aluminum flashing around the edge of the pavers. The flashing extended 50 mm above the top surface of the paver. Water was then flooded onto the top surface of the paver up to maximum flow rate of 1.6 liters per second over an exposed surface area of 370×370 mm. The porosity of the paver was greater than this flow rate as evidenced by the lack of 'ponding' or pooling on the paver surface.

The fluid permeable composite material allows drainage through the paver greater than what would be obtained with a 700 mm/hr rainfall or 700 l/m2/hr. This porosity is well in excess of any rain fall intensity for a 5 minute duration given in standard AS3500.3.2-1998.

Ductility, Tensile Stress and Light Weight Properties

The fluid permeable composite material exhibits ductile failure in either compressive or tensile circumstances without the need for reinforcing. Concrete and fired clay products without steel reinforcing exhibit brittle failure. That is, at the point of fracture, it breaks immediately and fails totally. Concrete with steel reinforcing still exhibits brittle fracture, but the reinforcing steel gives the structure ductile properties. In contrast, the cured composite material at the point of fracture, does not immediately break and fail, rather, it commences to fail and will still maintain many of its properties. Failure is rupture rather than brittle failure. Typically, a section of 350 mm×100 mm×100 mm constructed from an aggregate of 10 mm to 15 mm particulate material and supported 25 mm from each end, displays maximum load of 6050 N before failure.

Also advantageously, the fluid permeable composite material achieves high tensile stress in outer fibre construction, i.e. unlike conventional concrete or fired clay, the structure is flexible and has substantial flexural strength. Flexural strength is desirable as it provides the structure to carry higher loads. Typically, a section of 350 mm×100 mm×100 mm constructed from particulate material of 10 mm to 15 mm and supported 25 mm from each end, displays deflection at rupture value of 0.98 mm, elastic modulus of 1740 mpa and modulus of rupture 1.83 mpa.

The fluid permeable composite material is light weight, weighing less than existing like composite materials. Typically concrete pavers and the like, weighs ca. 110 kgs per square meter at 50 mm thick, whereas the fluid permeable composite material, when constructed from media with specific gravity of 2.8, weighs 66 kgs per square meter at 50 mm thick.

While the inventor anticipates wide application of the fluid permeable composite material in the form of pavers and tiles, other applications are also contemplated given the desirable properties described above.

Storm Water Collection Pit Covers

Advantageously, the fluid permeable composite material has high structural integrity and therefore can be used both supported and unsupported for many engineering applications, such as roadways, retaining walls and stormwater entry grates and pits.

In an alternate embodiment, the present invention provides a means of filtering pollutants from storm water runoff as water passes from paved areas into the storm water collection system.

Currently, storm water collection pits co-exist with paved areas such as roadways and car parking stations. Water is collected on paved surfaces during rainfall and flows to the lowest point on that paved area. It is intended that runoff water from paved areas be collected before pooling to avoid flooding. Runoff water is collected at various points on the paved area and directed through a system of under ground pipes to outfall areas where water is discharged into waterways. Runoff water transfers from paved areas to the underground pipe system through storm water collection pits. Typically these are of a box construction, usually concrete, and installed across the flow of runoff water, below the surface level of the paved area. Runoff water flowing toward low points in paved areas, drops into the collection boxes.

Collection boxes have two types of entry, in ground and side entry. In ground entry is at the same level as the pavement and are protected by metal grates strong enough to support vehicle weight and with openings large enough for required water capture. However, these metal grates have been shown to be unsafe for pedestrian and cycling traffic. In addition, they have no means of pollution filtration, i.e. existing metal inlet grates do not filter pollutants from stormwater as it enters the collection pits.

Side entry openings are vertical openings, usually built into the side of gutter drains, and are uncovered. Protective grates or pollution filtration covers are not available for side entry openings. As storm water runoff travels across paved surfaces, gross pollutants, eg. cigarette butts, plastic bags, paper and leaf litter are collected and deposited into collection pits.

The inventor anticipates that the fluid permeable composite material may be used to filter pollutants from stormwater prior to entry into the collection system by providing a stormwater cover at collection box entry points. An embodiment of a typical storm water cover is shown in FIG. 1. The cover 10 includes the fluid permeable composite material 12 housed by a steel frame 14. Dimensions may be varied according to the type, size and shape of stormwater collection pit entry opening eg. whether the opening is in-ground or Lintel (side entry) type, type of traffic which normally transverse the collection pit, if any, and water capture requirement of the collection pit.

Advantageously, use of the fluid permeable composite material in this way allows rain and storm water to collect and drain through the surface. Gross pollutants, such as plastic bags and bottles, leaf litter, cigarette butts and the like are left on the surface, and some micro contaminants such as hydrocarbons, heavy metals and carbon monoxide solids are trapped within the permeable mass of the composite material. Water entering outfall systems is therefore pre-filtered before entering outfalls, with obvious benefits to the environment Sound Reduction Applications The inventor further anticipates that the fluid permeable composite material may find application as an effective sound reduction material. When sound energy is directed at the fluid permeable composite material, some will deflect from the facets of the irregular composite surface and some will enter the voids and be absorbed within the composite material. Typically, a composite material of 50 mm thick of 10 mm to 15 mm irregular shaped particulate material provides considerable sound reduction, eg. from 25 db to 40 db.

Effectiveness as a sound reduction composite material is determined by the size and shape of the media, and by the percentage of void within the permeable mass. Irregular media shape and greater percentage of void within the mass, increases the effectiveness in reduction of sound. It is anticipated that the composite material would find application in large commercial premises, such as indoor pool complexes, auditoriums, roadside sound reduction panels and in dividing walls between higher density commercial and residential properties. It will be appreciated by the skilled person that the present invention is not limited to the embodiments described in detail herein, and that a variety of other embodiments may be contemplated which are nevertheless consistent with the broad spirit and scope of the invention.

The invention claimed is:

1. A process for manufacturing a fluid permeable composite material including the steps of providing a curable composition for producing a fluid permeable composite material comprising:
a particulate material; and
a binding agent including:
from 25 to 50 percent by weight of an acrylic polymer based on methacrylate;
fibre, present in an amount of up to 25% by weight;
from 10 to 35% by weight of a homopolymer of an isocyanate and corresponding isocyanate polymerising agent for forming a crosslinked polymer with said acrylic polymer; and
from 20 to 60% by weight of a low molecular weight solvent selected from C1 to C6 esters, hydrocarbon solvents, or C1 to C6 ketones, which low molecular weight solvent flashes off or evaporates during curing of the composition to leave voids in the cured composition;
compressing the curable composition and curing the composition at a temperature above the glass transition temperature of the binder such that the solvent flashes off or evaporates to leave voids in the cured composition, and subsequently reducing the temperature.

2. A process as claimed in claim 1, wherein the process includes the step of pre-coating the particulate material with a pre-coat of the binding agent, curing the pre-coat and subsequently coating the particulate material with the binding agent.

3. A process as claimed in claim 1, wherein the binding agent is cured at a temperature of about 10° C. above the glass transition temperature of the binder.

4. A process as claimed in claim 1, wherein the low molecular weight solvent is present in an amount of from 20 to 50% by weight.

5. A process as claimed in claim 1, wherein the C1 to C6 esters are selected from tert-butyl acetate or n-butyl acetate, the hydrocarbon solvents are selected from benzene, toluene, dimethyl benzene, ethyl benzene, cyclohexane, cumene, naphthalene, anthracene, biphenyl, cycloterpenes or terphenyl.

6. A process as claimed in claim 1, wherein the particulate material is a stone aggregate or a ceramic aggregate.

7. A process as claimed in claim 1, wherein the acrylic polymer based on methacrylate is selected from ethyl methacrylate, methacrylate copolymers, methyl methacrylic, butyl methacrylic or methyl methacrylate copolymer.

8. A process as claimed in claim 7, wherein the acrylic polymer is methyl methacrylate copolymer and it is present in an amount of from 25 to 40% by weight of the binding agent.

9. A process as claimed in claim 8, wherein the methacrylate copolymer is present in an amount of about 30% by weight of the binder.

10. A process as claimed in claim 1, wherein the fibre is selected from from glass fibre, aramid fibre, carbon fibre or natural fibre.

11. A process as claimed in claim 10, wherein the fibre is glass fibre having a length ranging from 0.5 mm to 6 mm fibre length.

12. A process as claimed in claim 11, wherein the glass fibre is present in an amount of about 9% of the binder.

13. A process as claimed in claim 10, wherein the glass fibre is present in an amount of about 9% of the binder.

14. A process as claimed in claim 1, wherein the homopolymer of the isocyanate and the corresponding isocyanate polymerising agent is selected from hexamethylene diisocyanate homopolymer: hexamethylene diisocyanate, methylene diphenyl diisocyanate homoploymer: methylene diphenyl diisocyanate, toluene diisocyanate homopolymer: toluene diisocyanate, polymeric methylene diphenyl diisocyanate homopolymer: polymeric methylene diphenyl diisocyanate, naphthalene diisocyanate homopolymer: naphthalene diisocyanate, or methyl isocyanate homopolymer: methyl isocyanate.

15. A process as claimed in claim 1, wherein the homopolymer of the isocyanate and the corresponding isocyanate polymerising agent is present in an amount of about 25% by weight of the binder.

* * * * *